P. L. HOLCOMB.
DUMP WAGON WITH LOADING ATTACHMENT.
APPLICATION FILED DEC. 4, 1911.
1,035,440.
Patented Aug. 13, 1912.
2 SHEETS—SHEET 1.
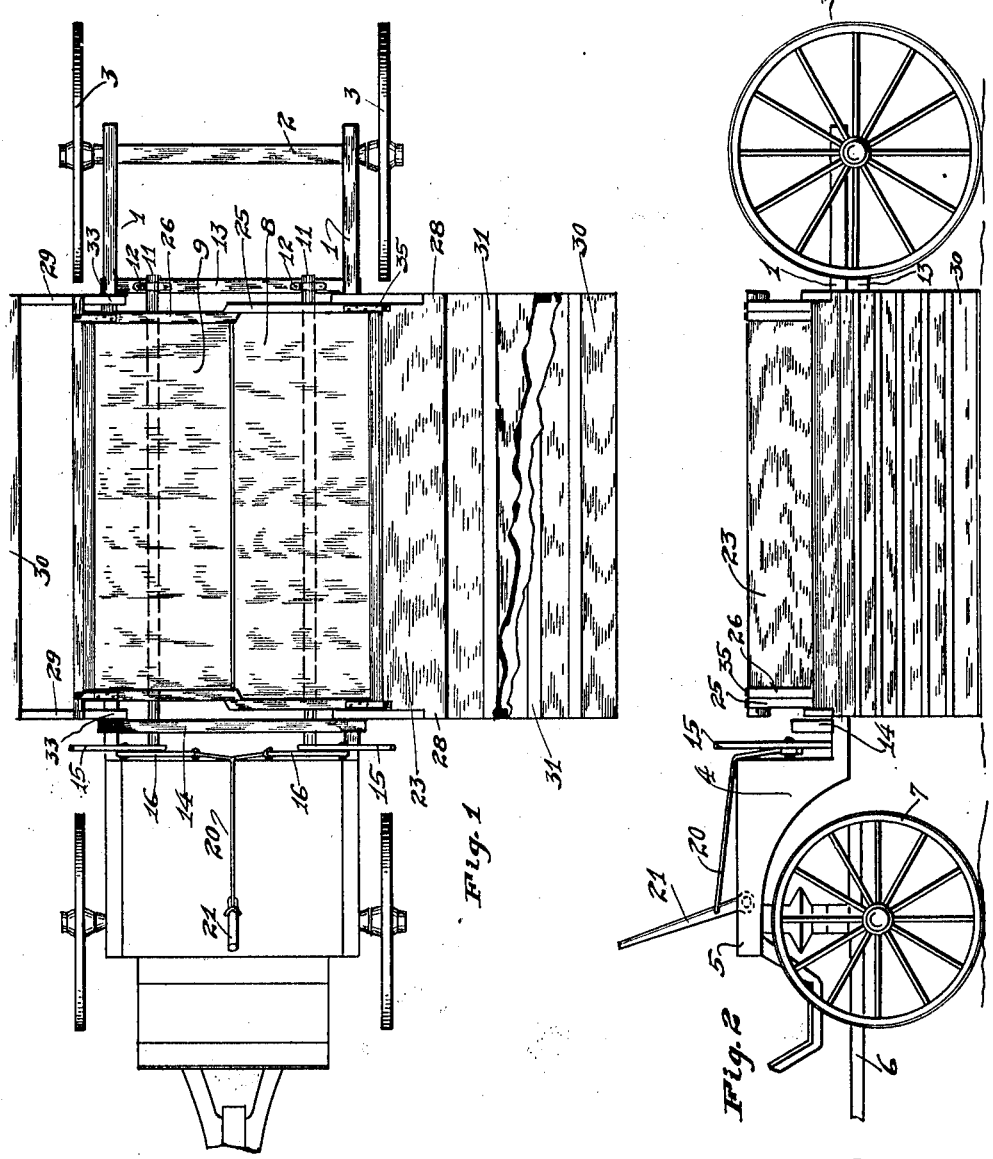
WITNESSES:
INVENTOR
Preston L. Holcomb.
BY
Attorney P. L. HOLCOMB.
DUMP WAGON WITH LOADING ATTACHMENT.
APPLICATION FILED DEC. 4, 1911.
1,035,440.
Patented Aug. 13, 1912.
2 SHEETS—SHEET 2.
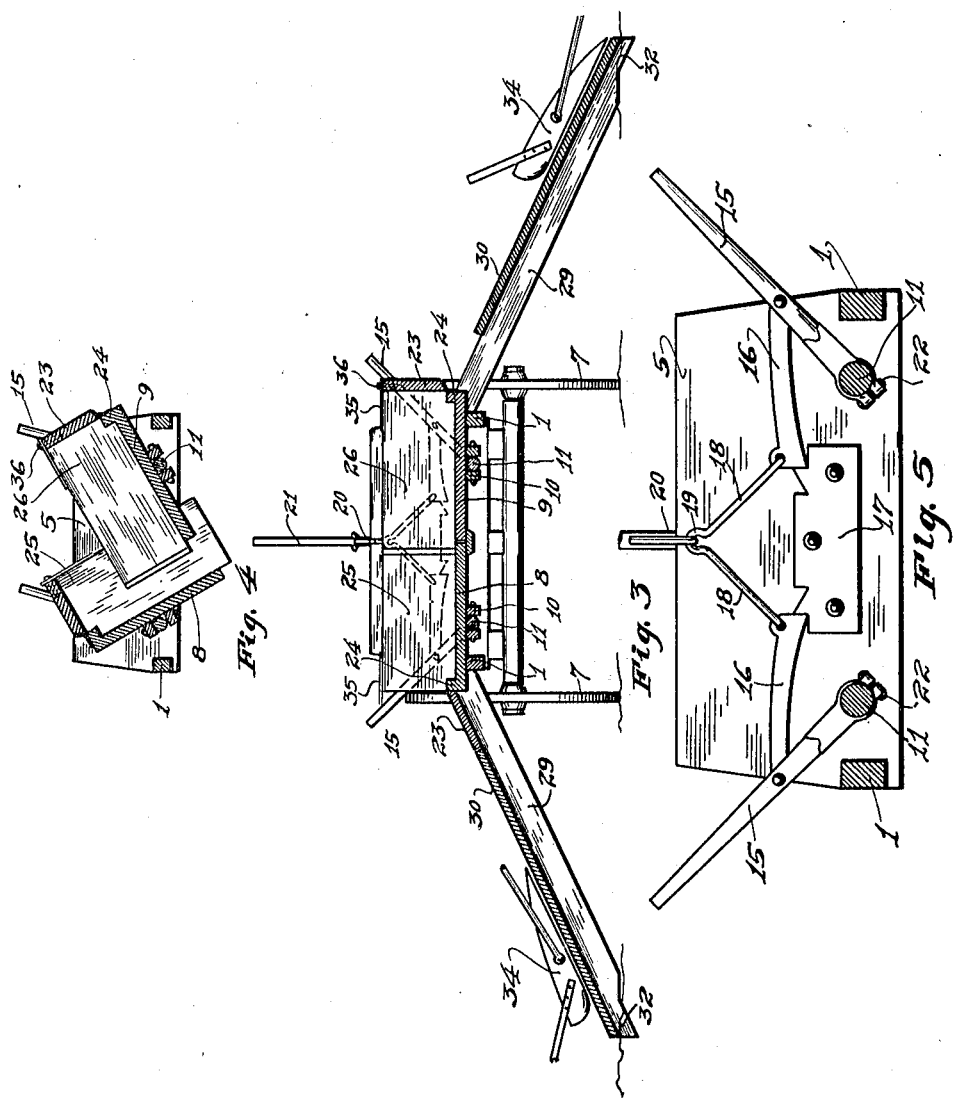
WITNESSES:
INVENTOR
*Preston L. Holcomb.*
BY
*Attorney*

UNITED STATES PATENT OFFICE.

PRESTON L. HOLCOMB, OF BIRMINGHAM, ALABAMA.

DUMP-WAGON WITH LOADING ATTACHMENT.

1,035,440. Specification of Letters Patent. Patented Aug. 13, 1912.

Application filed December 4, 1911. Serial No. 663,827.

*To all whom it may concern:*

Be it known that I, PRESTON L. HOL-COMB, a citizen of the United States of America, residing at Birmingham, in the county of Jefferson and State of Alabama, have invented certain new and useful Improvements in Dump-Wagons with Loading Attachments, of which the following is a specification.

My invention relates to an improved dumping wagon and means for conveniently loading the same by means of drags or scrapes drawn by teams, and my object is to design a strong and inexpensive construction so arranged that teams drawing the loaded scrapes can pass continuously up an incline and over the wagon body and down an incline. I have designed a wagon body which is especially adapted for this object in that the frame is set low and is divided in half longitudinally so as to require the minimum clearance when the parts of the body swing to dump the contents. In order to further reduce the steepness of the leading inclines, I adapt the side or end boards of the wagon body, preferably the side boards, to swing down to the level of the inclines so that the latter lead practically to the floor level of the wagon body. I prefer to load from the sides as this will not require the unhitching of the team from the dump wagon.

A further object of my invention is to so design the wagon that the inclines are supported directly from the frame on which the body rests, thereby enabling me to use light inclines which are convenient for transportation.

My invention further comprises the details of construction and arrangement of parts, all of which are hereinafter more particularly described and claimed, and which in their preferred form are illustrated in the accompanying drawings, in which:—

Figure 1 is a top plan view of the wagon body showing inclines in position for loading. Fig. 2 is a side elevation of Fig. 1, the far side wall of the wagon body being shown in raised position. Fig. 3 is a vertical transverse sectional view taken centrally of Fig. 2. Fig. 4 is a partial view similar to Fig. 3, showing the wagon body in dumping position. Fig. 5 is an enlarged detail view of the ratchet mechanism for locking the wagon body in position to receive its load.

Similar reference numerals refer to similar parts throughout the drawings.

The wagon body, which as best I prefer, adapted for my purposes, comprises a main frame formed of side members 1, preferably made of metal, which are supported at their rear ends by an axle 2 on which the rear wheels are mounted. At their forward ends the side members 1 are bent upwardly and reinforced at 4 and support a seat platform 5, which is suitably connected to draft gear 6 so as to permit the forward wheels 7 to cut under the platform 5. The wagon body is divided on a longitudinal central plane into the sections 8 and 9, each of which has fastened thereto along its underface two bars 10 which are spaced to receive between them a longitudinal axis or shaft 11, each body section being rigidly bolted to its respective shaft by bolts which pass through the members 10 and the shaft at suitable intervals. These shafts 11 are supported at one end in bearings 12 which are mounted upon a cross bar 13 rigidly attached to the rear portion of the side members 1. At their forward ends the shafts journal in and project beyond a cross bar 14, also rigidly connected to the members 1, and are each provided with an operating handle 15 to which, at an intermediate point, is pivotally connected a dog 16. These two dogs extend toward the center of the wagon and are adapted to engage the teeth on a ratchet plate 17 rigidly bolted to a cross plate fastened to the upright portions 4 of the side members 1, as seen in Fig. 5. The teeth on plate 17, on opposite sides of its center, are reversely disposed and the two dogs, at their free ends, are connected by links 18 having their upper eyes 19 connected to a chain or cable 20 which passes up over the rear portion of the seat platform 5 and is connected to an operating lever 21 pivotally supported upon the platform 5. Preferably the handles 15 are provided at their lower ends with clips which are tightly clamped by bolts 22 about the shafts 11.

Each wagon section 8 and 9 comprises a side board 23 which is hinged to a side plate 24 in such manner that the sides 23 are adapted to swing down to an inclined position, as shown in Fig. 4, with their top edges substantially on a level with the top edges of the side plates 24. The body section 8 has end boards 25, while the section 9 has end boards 26, which latter are provided with beveled forward edges that are overlapped by the adjacent edges of the ends 25. The shafts 11 are positioned approximately under the transverse center of each body portion 8 and 9 so that the weight thereon is supported by the shafts and the side members 1.

Each side board 23 is provided with a lateral supporting shoulder 28 which is adapted to engage and rest upon the side members 29 of the loading inclines. These side members 29 at their upper ends are adapted to be supported by the body supporting frame which they engage on each side of the wagon body which is thus left free to tilt in dumping. The inclines are provided with a suitable tread surface 30 having preferably spaced strips 31 attached to its top surface which preferably is terminated at a point spaced from the wagon body (see Fig. 4) so that when the side boards 23 are folded down upon the adjacent members 29 they will form a continuation of the tread surface of the inclines. The members 29 may be provided with a pointed bottom end 32 which will better brace the wagon against lateral strain. The upper end of the members 29 may have bolted thereto a metal strap 33 which is bent to form a hook which engages the side members 1 of the frame and holds the loading incline in positive engagement with the wagon frame.

In operation, a wagon to be loaded is driven to a point convenient to the teams which are collecting the material to be transported in scrapes or scoops 34 in the manner well understood. The body is locked in the position shown in Figs. 3 and 5 by causing the dogs 16 to engage the teeth in plate 17. The platforms 30 are arranged on each side of the wagon with their upper ends resting on the members 1 of the wagon frame and then the sides 23 are swung down to rest upon the incline members 29 to form a continuous platform, as it were, over which the teams are driven and in crossing the wagon body the scrape is dumped. The driver for the team is available for distributing the material about the wagon and when it is sufficiently loaded the sides 23 are grasped either by hand or by any suitable leverage device and swung up to a vertical position, thereby forcing into the wagon body any material resting on them. The sides are locked in their raised position by pins 36 which are passed down through an opening in a metal strip 35, one of which is bolted at the outer top edge of each end plate 25 and 26. The inclines are disengaged from the wagon which is then driven off to the point for dumping and when this is reached the lever 21 is thrown forward thereby disengaging the dogs 16 from the plate 17 and permitting the material pressing down on the center of the body section 8 and 9 to swing them downwardly about their shafts 11 and dump their contents. In this operation the sharpened edges 27 of the end boards 26 of the body section 9, cuts through the material on the section 8. The handles 15 are grasped and drawn down until the dogs 16 again engage the teeth on plate 17 to restore the wagon body to position for its return trip to be loaded.

Where it is not convenient to bring the wagon close to the work and the scoops have to be drawn to the wagon for a considerable distance, it is preferable to have the teams pass over the wagon in the manner described, but where the wagon can be moved to the point where the dirt is to be taken out, I find that my apparatus may be practically used with a single incline by using a long draft chain to the scoop and passing the chain over the wagon. This draft chain is drawn by the team on the opposite side of the wagon from the incline so that the team will draw the scrape up the incline and into the wagon body where it is dumped.

Having thus described my invention, what I claim as new and desire to secure by Letters Patent, is:—

1. In an apparatus of the character described, the combination of a wagon frame mounted on wheels, a dumping wagon body mounted on said frame and disposed between the front and rear wheels, side boards on said body adapted to fold down, and loading inclines adapted to rest on said frame and to be interposed between the forward and rear wheels, substantially as described.

2. In an apparatus of the character described, the combination of a dumping wagon body, a wheel supported frame on which said body is mounted, loading inclines adapted to be disposed on opposite sides of the wagon between the wheels and to rest with their upper ends upon said frame, and side boards on the body adapted to fold downwardly substantially to a level with the top of the inclines, substantially as described.

3. The combination with a dumping wagon having a side wall adapted to fold downwardly, and a rigid wheel supported frame upon which said body is mounted, of a loading incline adapted to lean against said frame and to have said side folded down thereupon, as and for the purpose described.

4. The combination with a dumping wagon having a side wall adapted to fold downwardly, and a rigid wheel supported frame upon which said body is mounted, of oppositely disposed loading inclines adapted to lean against the sides of said frame, said side walls being adapted to fold down on an incline on each side, as and for the purposes described.

5. The combination with a wagon comprising a wheel supported frame, a wagon body divided into longitudinal halves, means to mount each half on a longitudinal pivoted support mounted in said frame, said pivot being substantially at the transverse center of each body section, side boards hinged to the body so as to swing down substantially to a level with the bottom of the body, and front and rear wheel supports for the said frame which are spaced apart substantially the length of the wagon body, of loading inclines adapted to rest on said frame and rise to a level substantially with the wagon body bottom and to pass in between the wheel supports, substantially as described.

6. In an apparatus of the character described, a rigid frame having wheel supports at each end, a dumping wagon body formed in longitudinal sections which are pivotally mounted in said frame, and side walls for the body which fold downwardly, in combination with loading inclines adapted to be interposed between the wheel supports and to rest upon the sides of said frame and rise substantially to a height of the wagon body, substantially as described.

7. A dumping wagon comprising a frame supported on wheels at its ends and having intermediate cross members, a body mounted on said frame and divided into longitudinal halves which have bottom boards that abut and end boards which overlap when the body is in assembled position, means to pivotally support each section substantially opposite its transverse center, means to lock the section in horizontal position, means to release the body sections to permit them to dump, and a side board on each section hinged to swing down, substantially as described.

8. A dumping wagon comprising a frame supported on wheels at its ends and having intermediate cross members, a body mounted on said frame and divided into longitudinal halves which have bottom boards that abut and end boards which overlap when the body is in assembled position, means to pivotally support each section substantially opposite its transverse center, means to lock the sections in horizontal position, means to release the body sections to permit them to dump, and a side board on each section to swing down approximately to the floor level of the body, in combination with loading incline having its upper end adapted to straddle the wagon body and rest on the frame, substantially as described.

9. In combination, a dumping wagon body having side boards hingedly connected to the body so as to swing down, a wagon frame supporting said body and mounted on wheels, loading inclines adapted to rest on said frame, and a platform extending part of the way up each incline, said side members being adapted to rest upon said inclines and form a part of the platform leading from the ground to the wagon body, substantially as described.

10. The combination with a dumping wagon having a side wall adapted to fold downwardly, of a loading incline adapted to be supported by the wagon with its upper end substantially on a level with the floor of the wagon, said side wall being adapted to fold down so as not to interfere with the movement of scrapes up the incline and into the wagon body, as and for the purposes described.

In testimony whereof I affix my signature in presence of two witnesses.

PRESTON L. HOLCOMB.

Witnesses:
NOMIE WELSH,
P. D. JOHNSTON, Jr.

---

Copies of this patent may be obtained for five cents each, by addressing the "Commissioner of Patents, Washington, D. C."